UNITED STATES PATENT OFFICE.

ADOLF OESTERHELD, OF HERSFELD, GERMANY.

PROCESS OF MANUFACTURING FABRICS.

SPECIFICATION forming part of Letters Patent No. 722,246, dated March 10, 1903.

Application filed July 18, 1901. Serial No. 68,718. (No specimens.)

*To all whom it may concern:*

Be it known that I, ADOLF OESTERHELD, of Hersfeld, Hesse, Germany, have invented certain new and useful Improvements in a Process of Manufacturing Fabrics, of which the following is a specification.

This invention has for its object a process for making fabrics and useful articles from mineral, vegetable, or animal fiber and adhesive substances — such as india-rubber, gutta-percha, and the like — the fiber being so distributed by the use of a blast that the particles lie in all directions, by which arrangement they are thoroughly combined with one another and are completely saturated by the adhesive substance employed, so that the product forms a perfectly homogeneous whole. By this process an extremely resistant material of a kind hitherto unknown is made in the cheapest manner, which material is applicable for various technical and electrotechnical purposes.

The process is as follows: Perfectly dustless, well opened, and torn fibers are drawn up by means of a blast into an air-chamber or blowing-chamber containing warm air suitable for the actual purpose intended and are caused to be deposited in the form of flakes on an endless band or cloth previously coated with a suitable adhesive substance, (india-rubber, gutta-percha, spermaceti, artificial gum, resin, or other material,) this endless cloth traveling from a source of power and being slowly drawn through the air-chamber, each layer of material conveyed thereon being thus dried. In the further course of the endless cloth this layer passes through a calendering-machine standing outside the air-chamber, in which machine the fiber and adhesive are thoroughly combined by strong pressure and then conveyed into a spreading-machine effecting the application of the adhesive, or one of the known spraying-machines, which again effects a further application of adhesive. A further layer of fiber is during this time being blown onto the endless band in the air-chamber. This layer is then again passed through rollers and coated with a layer of adhesive and then again covered with fiber by another passage through the air-chamber. This process is continued until the sheet to be made has reached the desired thickness, so that the sheet which is to be produced consists of four, five, six, or more layers of adhesive and fiber. When completed, the movement of the cloth is stopped and the desired fabric is in a condition of rest ready for further treatment in the ordinary manner.

For making articles of a given form — such, for instance, as pneumatic tires for cycles, endless cloths, hose-pipes, rings, and the like — instead of the endless cloth a model shaped to correspond with the respective object to be produced — for instance, a ring for pneumatic tires or endless cloths and a core for hose-pipes — may be employed in a similar manner for receiving the layers of rubber and fiber, while the pressing of the fiber into the adhesive may be effected by means of a suitably-formed roller. The blowing on of the fiber is effected also in a similar manner as in the process first described by means of a blast in an air-chamber, so that the essential part of the process is exactly the same.

What I claim as new is —

The process of manufacturing a fabric or material of alternate layers of fiber and adhesive substance, which consists in covering an endless band with adhesive material, blowing fibers in all directions thereover by means of a blast of warm air, slowly drawing the same through an air-chamber to successively dry each layer of material, then calendering the material thus formed, applying strong pressure to thoroughly combine the fiber and adhesive material and then spraying the same with adhesive and applying a further layer of the fiber and subjecting the whole to pressure, all substantially as shown and described.

In witness whereof I have hereunto set my hand in the presence of two witnesses.

ADOLF OESTERHELD.

Witnesses:
L. RASCH,
C. C. STEVENSON.